(12) United States Patent
Bork

(10) Patent No.: US 7,215,346 B2
(45) Date of Patent: May 8, 2007

(54) READABILITY

(75) Inventor: Andreas Bork, Ulm (DE)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/881,964

(22) Filed: Jun. 30, 2004

(65) Prior Publication Data

US 2006/0001680 A1    Jan. 5, 2006

(51) Int. Cl.
*G09G 5/00* (2006.01)
(52) U.S. Cl. ..................... 345/629; 345/640
(58) Field of Classification Search ........... 345/594, 345/629, 640, 650–654, 661–665, 676–680; 710/73; 715/528, 700, 762, 763
See application file for complete search history.

(56) References Cited

U.S. PATENT DOCUMENTS 4,521,982 A * 6/1985 Altuchow .............. 40/407
6,809,741 B1 * 10/2004 Bates et al. ............. 345/597
6,993,404 B2 * 1/2006 Lev-Ami et al. ........ 700/109
2002/0045465 A1 * 4/2002 Kishida et al. .......... 455/566
2002/0186222 A1 * 12/2002 Morton et al. .......... 345/589
2003/0055945 A1 * 3/2003 Bear et al. ............. 709/223
2003/0093933 A1 * 5/2003 Bilbie et al. ........... 40/615

* cited by examiner

*Primary Examiner*—Kee M. Tung
*Assistant Examiner*—G. F. Cunningham
(74) *Attorney, Agent, or Firm*—Perman & Green, LLP

(57) ABSTRACT

A method of controlling a user interface to display a first graphical element and a second graphical element where the second graphical element, overlays at least a portion of a first graphical element, comprising: determining first color(s) corresponding to the color(s) of the first graphical element; determining second color(s) corresponding to the color(s) of the second graphical element; and determining, using the first color(s) and second color(s), whether or not to provide an interface region visually separating the second graphical element from the first graphical element.

23 Claims, 4 Drawing Sheets

READABILITY

FIELD OF THE INVENTION

Embodiments of the invention relate to methods of controlling a user interface, and in particular methods for controlling a user interface to display a first graphical element and a second graphical element where the second graphical element, overlays at least a portion of a first graphical element.

BACKGROUND TO THE INVENTION

Current mobile telephones have colored displays and it is possible for a user to choose a particular graphical element, such as a design or picture, as the colored background to the display. Information displayed via the display is displayed in the foreground in front of the background as one or more graphical elements. However, it can be difficult to see the graphical elements in the foreground if they have the same or similar coloration as the background.

It would be desirable to provide a way of visually separating a graphical element in the foreground from the background when necessary.

It would be desirable if this could be achieved in a manner that is suitable for hand portable devices with small displays.

BRIEF DESCRIPTION OF THE INVENTION

According to one embodiment there is provided a method of controlling a user interface to display a first graphical element and a second graphical element where the second graphical element, overlays at least a portion of a first graphical element, comprising: determining first color(s) corresponding to the color(s) of the first graphical element; determining second color(s) corresponding to the color(s) of the second graphical element; and determining, using the first color(s) and second color(s), whether or not to provide an interface region visually separating the second graphical element from the first graphical element.

According to another embodiment there is provided an electronic device comprising: a display; means for controlling the display to display a first graphical element and a second graphical element where the second graphical element, overlays at least a portion of a first graphical element; means for determining first color(s) corresponding to the color(s) of the first graphical element; means for determining second color(s) corresponding to the color(s) of a second graphical element; and means for determining, using the first color(s) and second color(s), whether or not to control the display to display an interface region visually separating the second graphical element from the first graphical element.

According to another embodiment there is provided method of controlling a user interface to display a first graphical element and a second graphical element where the second graphical element, overlays at least a portion of a first graphical element, comprising: either, generating image data for display on the display by combining sequentially a top image layer and a bottom image layer wherein the bottom image layer comprises the first graphical element and the top image layer comprises the second graphical element, or, generating image data for display on the display by combining sequentially a top image layer, a middle image layer and a bottom image layer wherein the bottom layer comprises the first graphical element, the top image layer comprises the second graphical element and the middle image layer comprises an interface portion for visually separating the first graphical element from the second graphical element.

According to another embodiment there is provided a method of branding a mobile cellular telephone comprising: displaying a background on a display; displaying a branding element on the display, overlaying the background; coloring an interface region at the boundary between the background and the branding element to visually separate the branding element from the background; enabling a user to change the background; and automatically changing the coloring of the interface region when the background is changed by the user.

The term 'graphical' is used to mean "of or relating to written representation or pictorial representation".

Embodiments of the invention provide a way of visually separating the foreground second graphical element from the background first graphical element when necessary, but without altering the image displayed when such separation is unnecessary. This is particularly advantageous when the electronic device is a hand held portable device with a small display size as even a small interface region may occupy a significant portion of the first graphical element (background).

BRIEF DESCRIPTION OF THE DRAWINGS

For a better understanding of the present invention reference will now be made by way of example only to the accompanying drawings in which.

DETAILED DESCRIPTION OF EMBODIMENTS OF THE INVENTION

Figure 1:
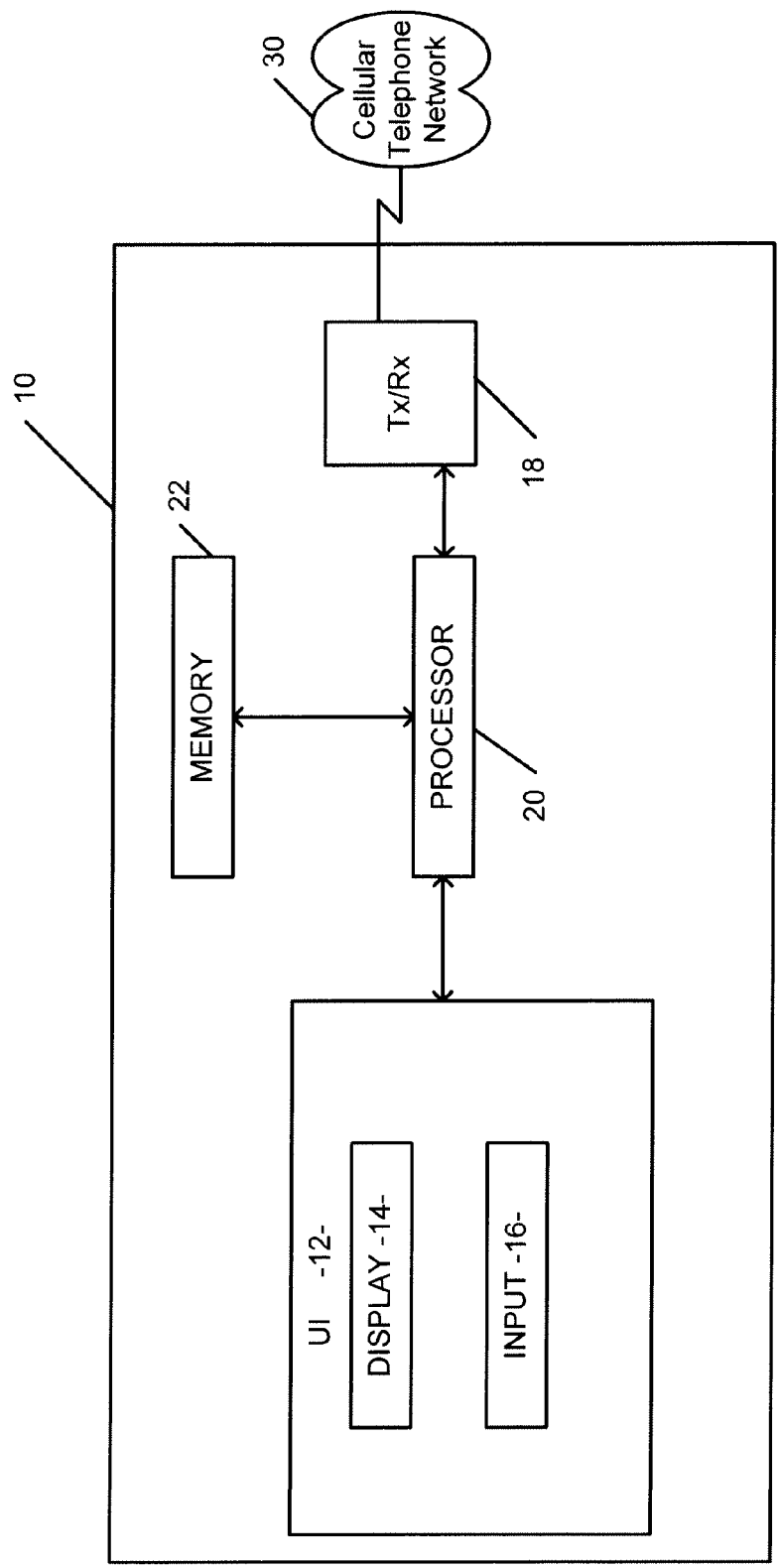
FIG. 1 illustrates an electronic device.

FIG. 1 illustrates an electronic device 10 comprising: a user interface 12 that comprises a display 14 and a user input device 16, such as a key, joystick, touch screen, voice recognition device or the like; a processor 20 and a memory 22. The processor is arranged to read from and write to the memory 22 and is arranged to provide control signals to the display 14 and to receive command signals from the user input device 16.

In this example, the device 10 is a mobile cellular telephone that additionally comprises a cellular radio transceiver 18 for communicating in a mobile cellular telephone network 30. The processor 20 is arranged to provide data to and receive data from the cellular radio transceiver 18.

Figure 2A:
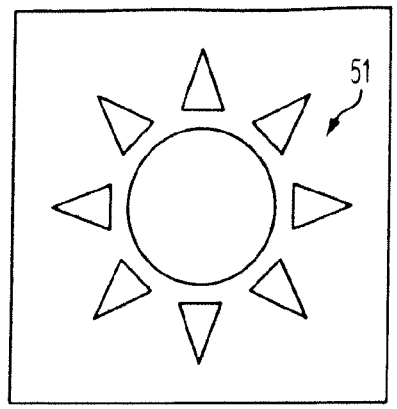
FIG. 2A illustrates a first graphical element.

FIG. 2A, illustrates a first graphical element 51 for display as a background to the display 14. The first graphical element may vary. For example, the background may be provided by pictures from a slide show, where the background picture is repeatedly replaced by a different picture. The background could also be provided by video where each video frame represents a different background. The background may also be a still picture or graphic that a user of the device has chosen, captured or downloaded for the purpose of display.

Figure 2B:
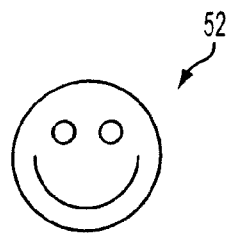
FIG. 2B illustrates a second graphical element.
Figure 2C:
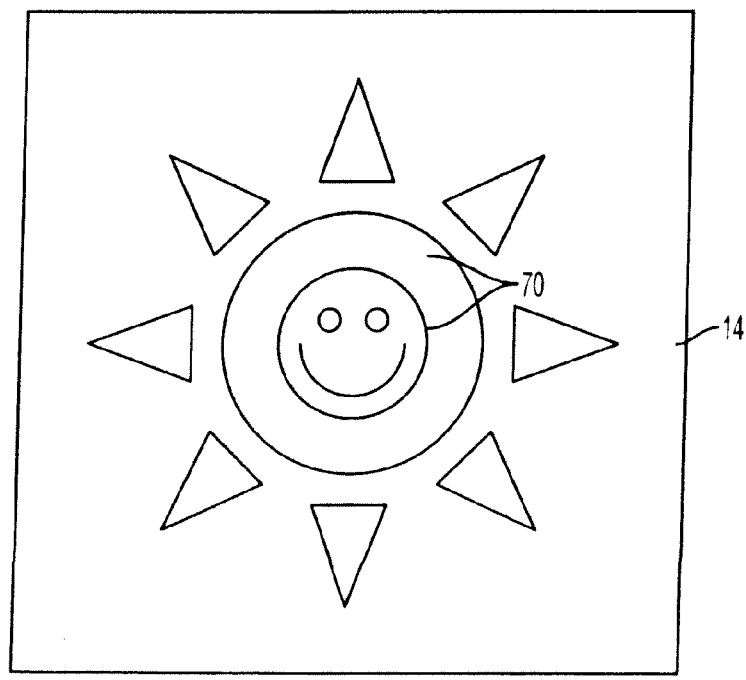
FIG. 2C illustrates a scenario in which the first graphical element overlaying the first graphical element is not visually distinct.

FIG. 2B illustrates a second graphical element for display in the foreground of the display 14. The second graphical element 52 would overlay at least a portion of a first graphical element 51. An example for such a composite image, without use of an interface region described below, is illustrated in FIG. 2C.

The second graphical element 52 may be a user interface element that indicates a function such as a soft (programmable) key descriptor 54 or may be an information element that conveys information to the user. A soft key descriptor would typically comprise text, which changes with the state of the telephone 10 as the function of its associated key 16 changes. An information element may be textual and/or pictorial. For example, it may be a brand logo identifying the origin of the device 10 or of a service provided by the device 10.

Where the first and second graphical elements are such that the overlaying second graphical element is not visibly distinct from the first graphical element (as in FIG. 2C), then the image displayed is adapted to improve the visibility of the second graphical element 52. An interface region 60 visually separating the second graphical element 52 from the first graphical element 51 is generated as illustrated in FIG. 2D.

Figure 2D:
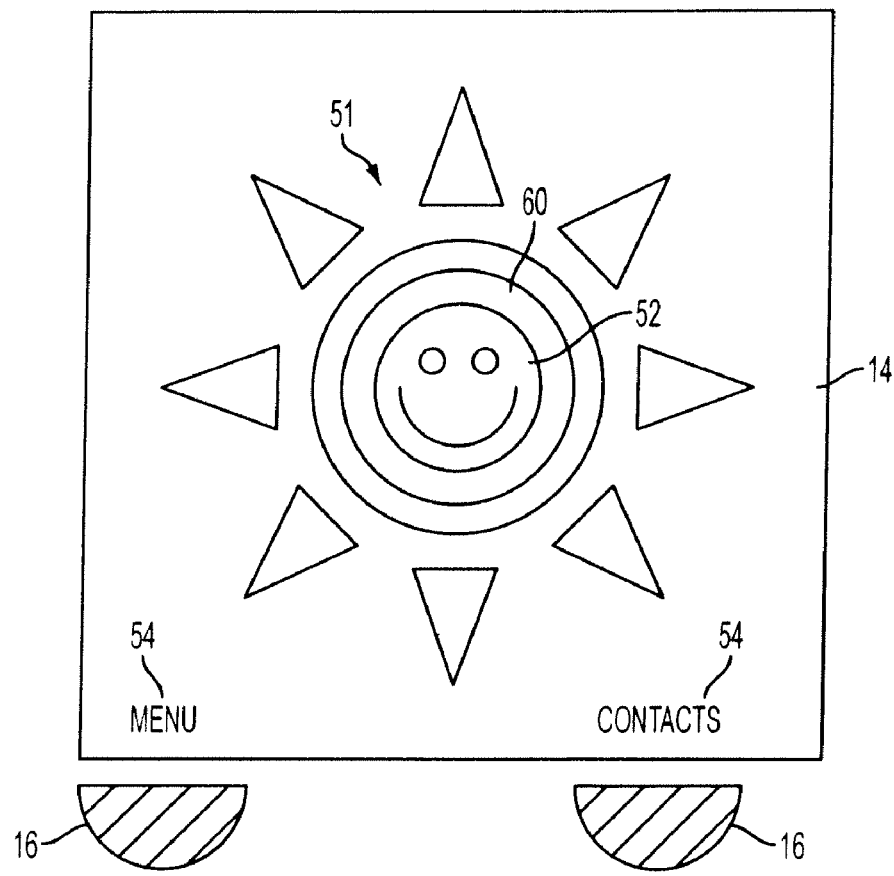
FIG. 2D illustrates a scenario in which the first graphical element overlaying the first graphical element is made visually distinct by an interface region that is interposed between the first and second graphical elements.

The interface region 60 is at the boundary 70 between the first and second graphical elements and is preferably, but not necessarily, within the first graphical element 51 as illustrated in FIG. 2D. The interface region 60 is arranged by color, shading, overlaying or the like to be visually distinct from the first graphical element 51 and visually distinct from the second graphical element 52.

As an example, the interface region may be colored so that it is visually distinct from color(s) of the first graphical element 51 and also visually distinct from color(s) of the second graphical element 52. The interface region may be colored using a single color, chosen by the process described below to be visually distinct from the first and second graphical elements. However, it is possible for the interface region to comprise multiple portions of different colors or for the interface portion to comprise a modified portion of the first and/or second graphical elements.

The interface region 60 in one embodiment extends around the whole of the edge of the second graphical element, but in another embodiment extends around only those portions of the edge where it is required to create visual distinctiveness. If the interface extends around the whole of the edge of the second graphical element, it may, for example, be a geometrically regular area, such as a rectangle or circle, surrounding and framing the second graphical element or it may skirt (fringe) the second graphical element.

Embodiments of the invention provide a method for determining whether or not to provide an interface region 60 visually separating the second graphical element 52 from the first graphical element 51, where the second graphical element 52, overlays at least a portion of a first graphical element 51. This method is initiated automatically when the first graphical element 51 and/or the second graphical element 52 is varied. The method involves the following steps:

a) the processor 20 determines first color(s) corresponding to the color(s) of the first graphical element;

b) the processor 20 determines second color(s) corresponding to the color(s) of the second graphical element; and c) the processor determines, using the first color(s) and second color(s), whether or not to provide an interface region visually separating the second graphical element from the first graphical element. This determination may use any suitable visual distinctiveness test. Several options are described below.

Optional Test A

For visual distinctiveness, the predominant color(s) of second graphical element 52 should not occur in the region of the first graphical element 51 bordering the second graphical element 52. According to this test, the second color(s) are the predominant colors of the second graphical element 52 and the first color(s) are those of the first graphical element 51 in the region of the boundary 70 between the first and second graphical elements. The region may be the portion of the first graphical element 51 contiguous with the boundary, or a defined area of the first graphical element 51.

Option Test B

For visual distinctiveness, the color(s) of second graphical element 52 in the region of the boundary 70 should not occur in any region of the first graphical element in the region of the boundary 70. According to this test, the first colors are those of the first graphical element 51 in a region neighboring the boundary 70 and the second color(s) are those of the second graphical element 52 in a region neighboring the boundary 70. The regions may be the portions of the respective graphical elements contiguous with the boundary, or a defined area of that graphical element Optional Test C For visual distinctiveness, the color(s) of second graphical element 52 in a first region where it borders the first graphical element 51 should not occur in a region of the first graphical element 51 bordering the first region of the second graphical element. According to this test, the first colors are those of the first graphical element 51 in a first region neighboring the boundary 70 and the second color(s) are those of a second graphical element 52 in a second region neighboring the boundary 70 and the first region. The first and second regions may be portions of the respective graphical elements contiguous with the boundary, or a defined area of that graphical element.

If an interface region 60 is not required, the processor 20 generates image data for display on the display 14 by combining sequentially a top image layer 80 and a bottom image layer 82 where the bottom image layer 82 comprises the first graphical element 51 and the top image layer 80 comprises the second graphical element 52.

Figure 3:
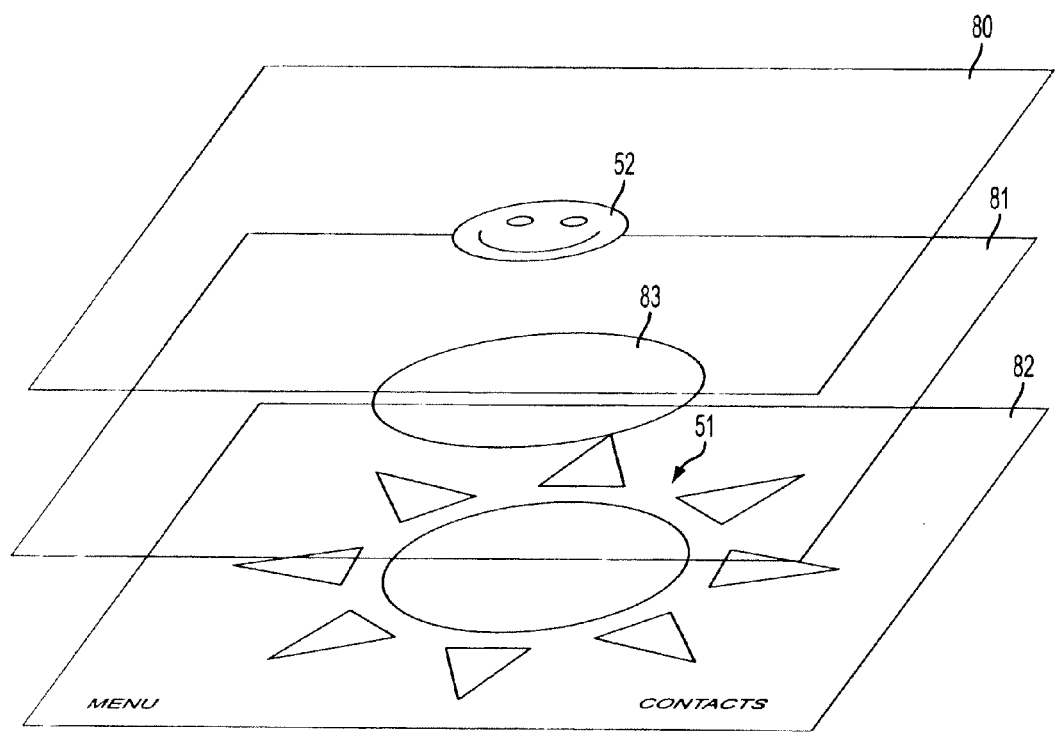
FIG. 3 illustrates the layers that are combined to make the image of FIG. 2D.

If an interface region 60 is required, the processor 20 generates image data for display on the display 14 by combining sequentially a top image layer 80, a middle image layer 81 and a bottom image layer 82 where the bottom image layer 82 comprises the first graphical element 51, the top image layer 80 comprises the second graphical element 52 and the middle image layer 81 comprises an interface portion 83 for visually separating the first graphical image 51 from the second graphical image 52. The layers are illustrated in FIG. 3. The interface portion 83 forms the interface region 60.

A suitable color or effect for the interface region also needs to be determined. Initially, the interface region 60 color is set to a default color such as white or black. Assuming that the interface region 60 occupies a portion of the first graphical element 51, the processor determines third color(s) corresponding to the color(s) of the remaining portion of the first graphical element. The processor 20 determines, using the third color(s) and second color(s), whether or not the interface region 60 in its default color visually separates the second graphical element from the first graphical element.

For example, the test for visual separation, may be that the interface color is significantly different from the color(s) of the first element in the regions where it borders the interface region 60 and/or that the interface color is significantly different from the color(s) of the second element in the regions where it borders the interface region 60. The regions may be limited to the portions contiguous with the interface region.

If the test is not passed then a color may be selected that does pass the test for visual separation. This selection may occur by choosing a color at random or by design and testing whether the interface region 60 in that color visually separates the second graphical element from the first graphical element. Alternatively, an algorithm may be used to select a color that visually separates the second graphical element from the first graphical element when used in the interface region 60.

If a suitable interface color cannot be found, then the size of the interface region 60 may be increased and the search for a suitable color repeated.

Embodiments of the invention have particular application to branding a mobile cellular telephone 10. A method of branding a mobile cellular telephone may comprise: displaying a background on a display; displaying a branding element on the display, overlaying the background; coloring an interface region at the boundary between the background and the branding element to visually separate the branding element from the background; enabling a user to change the background; and automatically changing the coloring of the interface region when the background is changed by the user. The branding element corresponds to the second graphical element described previously and may, for example, relate to a mobile cellular telephone manufacturer or a mobile cellular telephone network operator.

In the latter case, when the mobile telephone 10 attaches to the mobile cellular telephone network 30, the network 30 sends identification information to the telephone 10 that allows it to identify the network 30. The telephone 10 stores in the memory 22 a plurality of network identifiers (such as service names and logos) in association with the corresponding network identification information. If the identification information received from the network 30 corresponds to network identification information stored in the memory 22, then the associated network identifier is recalled from the memory 22 and displayed in the display 14 as the second graphical element described above. This network identifier will be displayed while the telephone 10 is attached to that network If the identification information received from the network does not correspond to network identification information stored in the memory, then the network identification information may be displayed in the display 14 as the second graphical element described above.

The use of an interface region 60 to visually separate a second graphical element from the background may be used for all types of second graphical elements or only for selected second graphical elements. For example, it may only be used when the second graphical element corresponds to the user's home mobile telephone network 30.

Although embodiments of the present invention have been described in the preceding paragraphs with reference to various examples, it should be appreciated that modifications to the examples given can be made without departing from the scope of the invention as claimed. For example, although the invention has been described in relation to a multi-color display it also finds application with a black and white display or similar. 'color' in relation to a multi-color display is used to refer to the frequency or frequencies of the visible electromagnetic radiation emitted by the display and the intensity of light emitted at those frequencies. For a black and white display, the term 'color' is synonymous with a grayscale value. Although the interface region has been described with reference to particular examples, it should be understood that many other implementations are possible that visually separate the second graphical element from the first graphical element.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A method of controlling a user interface to display a first graphical element and a second graphical element where the second graphical element, overlays at least a portion of a first graphical element, comprising:
   determining first color(s) corresponding to color(s) of the first graphical element;
   determining second color(s) corresponding to color(s) of the second graphical element;
   determining, using the first color(s) and second color(s), whether or not to provide an interface region between the first and second graphical elements visually separating the second graphical element from the first graphical element where the interface region is a color visually distinct from the first and second graphical elements; and
   providing the interface region when the overlaying second graphical element is not visibly distinct from the first graphical element.

2. A method as claimed in claim 1, wherein the interface region is within the second graphical element and at the boundary between the first and second graphical elements.

3. A method as claimed in claim 1, wherein the interface region is colored and the method further comprises determining the color of the interface region by selecting a color that is visually distinct from the first color(s).

4. A method as claimed in claim 3, further comprising:
   determining third color(s) corresponding to the color(s) of the second graphical element neighboring the-interface region; and
   determining the color of interface region by selecting a color that is visually distinct from the third color(s).

5. A method as claimed in claim 4, further comprising determining the size of the interface region dependent upon the color of the interface region.

6. A method as claimed in claim 1, wherein the interface region is sized and colored so that it is visually distinct from the first color(s) and also from third color(s) corresponding to the color(s) of the second graphical element neighboring the interface region.

7. A method as claimed in claim 1, wherein the interface region is colored so that it is a color different from the color(s) of the first element neighboring the-interface region and different from the color(s) of the second element neighboring the interface region.

8. A method as claimed in claim 1, wherein the interface region is colored using a single color.

9. A method as claimed in claim 1, wherein the interface region extends around the whole of the edge of the second graphical element.

10. A method as claimed in claim 9, wherein the interface region is a geometrically regular area surrounding the second graphical element.

11. A method as claimed in claim 9 wherein the interface region skirts the second graphical element.

12. A method as claimed in claim 1, further comprising:
generating image data for display on the display by combining sequentially a top image layer, a middle image layer and a bottom image layer wherein the bottom image layer comprises the first graphical element, the top image layer comprises the second graphical element and the middle image layer comprises a separator for visually separating the first graphical image from the second graphical image.

13. A method as claimed in claim 1, wherein the first graphical element is variable.

14. A method as claimed in claim 13, wherein the method is initiated automatically when the first graphical element is varied.

15. A method as claimed in claim 13, wherein the first graphical element is user-determined.

16. A method as claimed in claim 1, wherein the first graphical element is a background.

17. A method as claimed in claim 1, wherein the second graphical element comprises text.

18. A method as claimed in claim 1, wherein the second graphical element comprises a picture.

19. A method as claimed in claim 1, wherein the second graphical element is a brand logo.

20. A method as claimed in claim 1, for use in a mobile cellular telephone, further comprising:
attaching to a cellular telephone network;
detecting the identity of the network; and
displaying an identifier of the network as the second graphical element.

21. A method as claimed in claim 18, wherein the step of displaying the second graphical element is conditional upon the identity of a network corresponding to one or more stored identities.

22. A method as claimed in claim 20, wherein the displayed identifier is stored in a memory of the mobile cellular telephone.

23. An electronic device comprising:
a display;
means for controlling the display to display a first graphical element and a second graphical element where the second graphical element, overlays at least a portion of a first graphical element;
means for determining first color(s) corresponding to color(s) of the first graphical element;
means for determining second color(s) corresponding to color(s) of a second graphical element;
means for determining, using the first color(s) and second color(s), whether or not to control the display to display an interface region between the first and second graphical elements visually separating the second graphical element from the first graphical element where the interface region is a color visually distinct from the first and second graphical elements; and
means for providing the interface region when the overlaying second graphical element is not visibly distinct from the first graphical element.

* * * * *